US012651288B2

(12) United States Patent
Fox et al.

(10) Patent No.: US 12,651,288 B2
(45) Date of Patent: Jun. 9, 2026

(54) PHYGITAL INTEGRATION IN COMMERCE-BASED CHECKOUT EXPERIENCES

(71) Applicant: International Business Machines Corporation, Armonk, NY (US)

(72) Inventors: Jeremy R. Fox, Georgetown, TX (US); Martin G. Keen, Cary, NC (US); Alexander Reznicek, Troy, NY (US); Bahman Hekmatshoartabari, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 138 days.

(21) Appl. No.: 18/407,500

(22) Filed: Jan. 9, 2024

(65) Prior Publication Data

US 2025/0225562 A1 Jul. 10, 2025

(51) Int. Cl.
| | |
|---|---|
| *G06Q 30/00* | (2023.01) |
| *G06Q 30/0251* | (2023.01) |
| *G06Q 30/0601* | (2023.01) |

(52) U.S. Cl.
CPC ..... *G06Q 30/0631* (2013.01); *G06Q 30/0255* (2013.01); *G06Q 30/0261* (2013.01); *G06Q 30/0269* (2013.01)

(58) Field of Classification Search
CPC ........... G06Q 30/0631; G06Q 30/0255; G06Q 30/0261; G06Q 30/0269; G06Q 30/06311;

(Continued)

(56) References Cited

U.S. PATENT DOCUMENTS 10,325,102 B2    6/2019   Athulurutlrumala
10,798,547 B2 *  10/2020  Gold ..................... G06Q 30/02

(Continued)

OTHER PUBLICATIONS

"Digital commerce and ecommerce consulting | IBM", IBM, accessed on Nov. 27, 2023, 12 pages, <https://www.ibm.com/consulting/ecommerce>.

(Continued)

*Primary Examiner* — Robert M Pond
(74) *Attorney, Agent, or Firm* — Elliot J. Shine

(57) ABSTRACT

A computer-implemented method, a computer program product, and a computer system for phygital integration in commerce-based checkout experiences. A computer aggregates data from one or more personal devices of a user and data from one or more biosensors of the user. A computer trains a machine learning model on features extracted from aggregated data. A computer uses the machine learning model to predict purchase preferences of the user and to generate for the user personalized recommendations, promotions, and loyalty rewards. A computer generates notifications about the personalized recommendations, promotions, and loyalty rewards. A computer transmits the notifications to the one or more personal devices. A computer monitors interactions of the user with the personalized recommendations, promotions, and loyalty rewards. A computer uses information of the interactions to train the machine learning model for future prediction of the purchase preferences and future generation of the personalized recommendations, promotions, and loyalty rewards.

17 Claims, 7 Drawing Sheets

(58) Field of Classification Search
CPC ....... G06Q 30/06312; G06Q 30/06313; G06Q
30/06314; G06Q 30/06315
USPC ................................................... 705/26, 27
See application file for complete search history.

(56) References Cited

U.S. PATENT DOCUMENTS

| | | | |
|---|---|---|---|
| 10,977,907 B1 | 4/2021 | Zalewski | |
| 11,461,820 B2 * | 10/2022 | Fransen | G06Q 30/0631 |
| 2017/0372401 A1 | 12/2017 | Wang | |
| 2018/0053236 A1 * | 2/2018 | Fransen | G06Q 30/0633 |
| 2018/0089736 A1 | 3/2018 | Raravi | |
| 2020/0342968 A1 * | 10/2020 | Avinash | A61B 5/7267 |
| 2021/0312440 A1 | 10/2021 | Badal-Badalian | |
| 2022/0156764 A1 | 5/2022 | Garel | |
| 2022/0405775 A1 * | 12/2022 | Siebel | G06Q 30/0202 |
| 2023/0042210 A1 * | 2/2023 | Yee | G06F 40/211 |
| 2023/0420102 A1 * | 12/2023 | Walters | G16H 20/30 |

OTHER PUBLICATIONS

"Retail Technology Solutions from IBM", IBM, accessed on Nov. 27, 2023, 5 pages, <https://www.ibm.com/industries/retail>.
"Step-by-Step Guide to Wearable App Development in 2023", ScienceSoft, Healthcare, © 2023 ScienceSoft USA Corporation, 28 pages, <https://www.scnsoft.com/healthcare/medical-devices/wearable>.
Moravcikova et al., "Brand Building with Using Phygital Marketing Communication", Journal of Economics, Business and Management, vol. 5, No., 3, Mar. 2017, 6 pages.

* cited by examiner

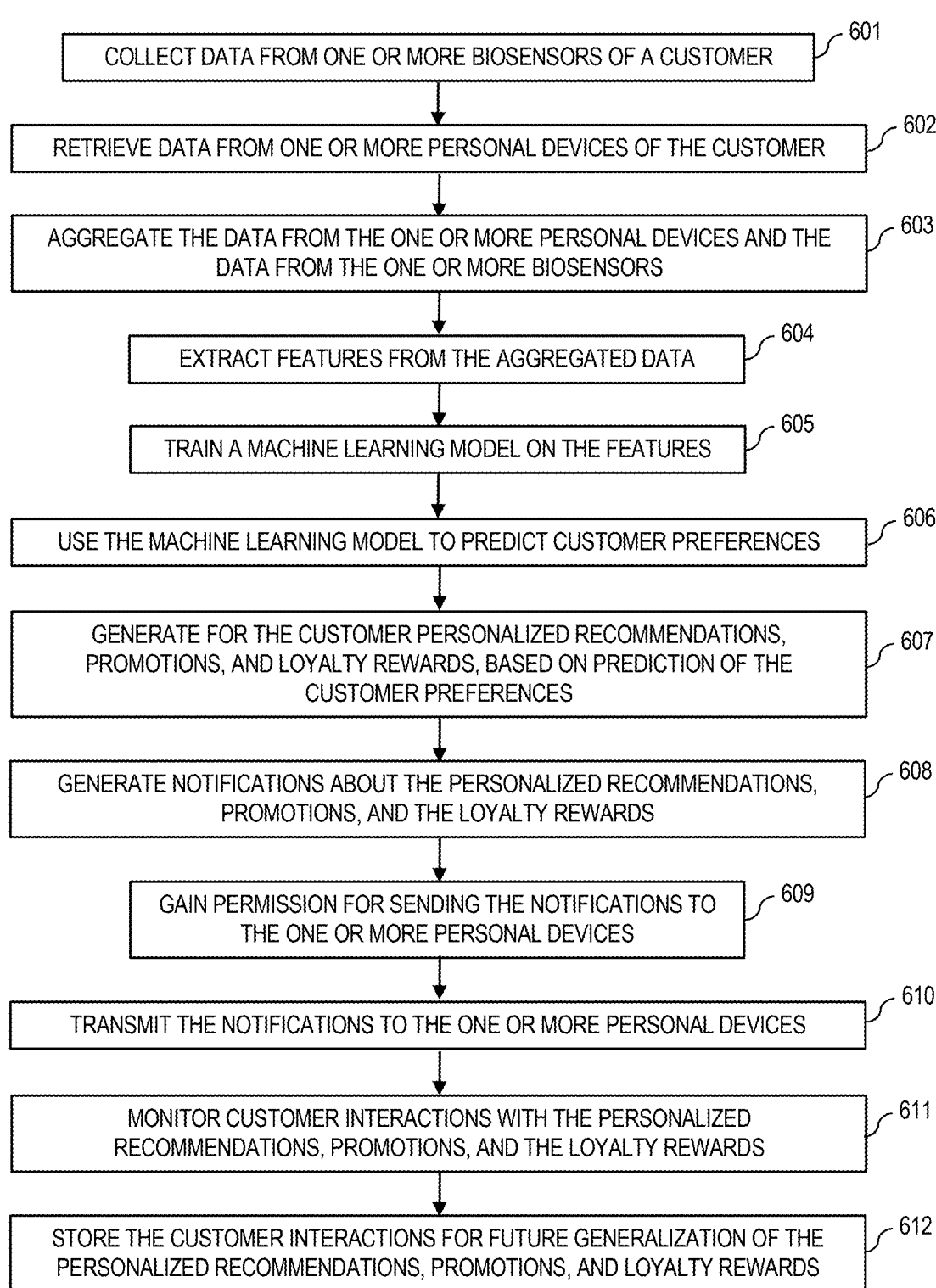

COLLECT DATA FROM ONE OR MORE BIOSENSORS OF A CUSTOMER  601

RETRIEVE DATA FROM ONE OR MORE PERSONAL DEVICES OF THE CUSTOMER  602

AGGREGATE THE DATA FROM THE ONE OR MORE PERSONAL DEVICES AND THE DATA FROM THE ONE OR MORE BIOSENSORS  603

EXTRACT FEATURES FROM THE AGGREGATED DATA  604

TRAIN A MACHINE LEARNING MODEL ON THE FEATURES  605

USE THE MACHINE LEARNING MODEL TO PREDICT CUSTOMER PREFERENCES  606

GENERATE FOR THE CUSTOMER PERSONALIZED RECOMMENDATIONS, PROMOTIONS, AND LOYALTY REWARDS, BASED ON PREDICTION OF THE CUSTOMER PREFERENCES  607

GENERATE NOTIFICATIONS ABOUT THE PERSONALIZED RECOMMENDATIONS, PROMOTIONS, AND THE LOYALTY REWARDS  608

GAIN PERMISSION FOR SENDING THE NOTIFICATIONS TO THE ONE OR MORE PERSONAL DEVICES  609

TRANSMIT THE NOTIFICATIONS TO THE ONE OR MORE PERSONAL DEVICES  610

MONITOR CUSTOMER INTERACTIONS WITH THE PERSONALIZED RECOMMENDATIONS, PROMOTIONS, AND THE LOYALTY REWARDS  611

STORE THE CUSTOMER INTERACTIONS FOR FUTURE GENERALIZATION OF THE PERSONALIZED RECOMMENDATIONS, PROMOTIONS, AND LOYALTY REWARDS  612

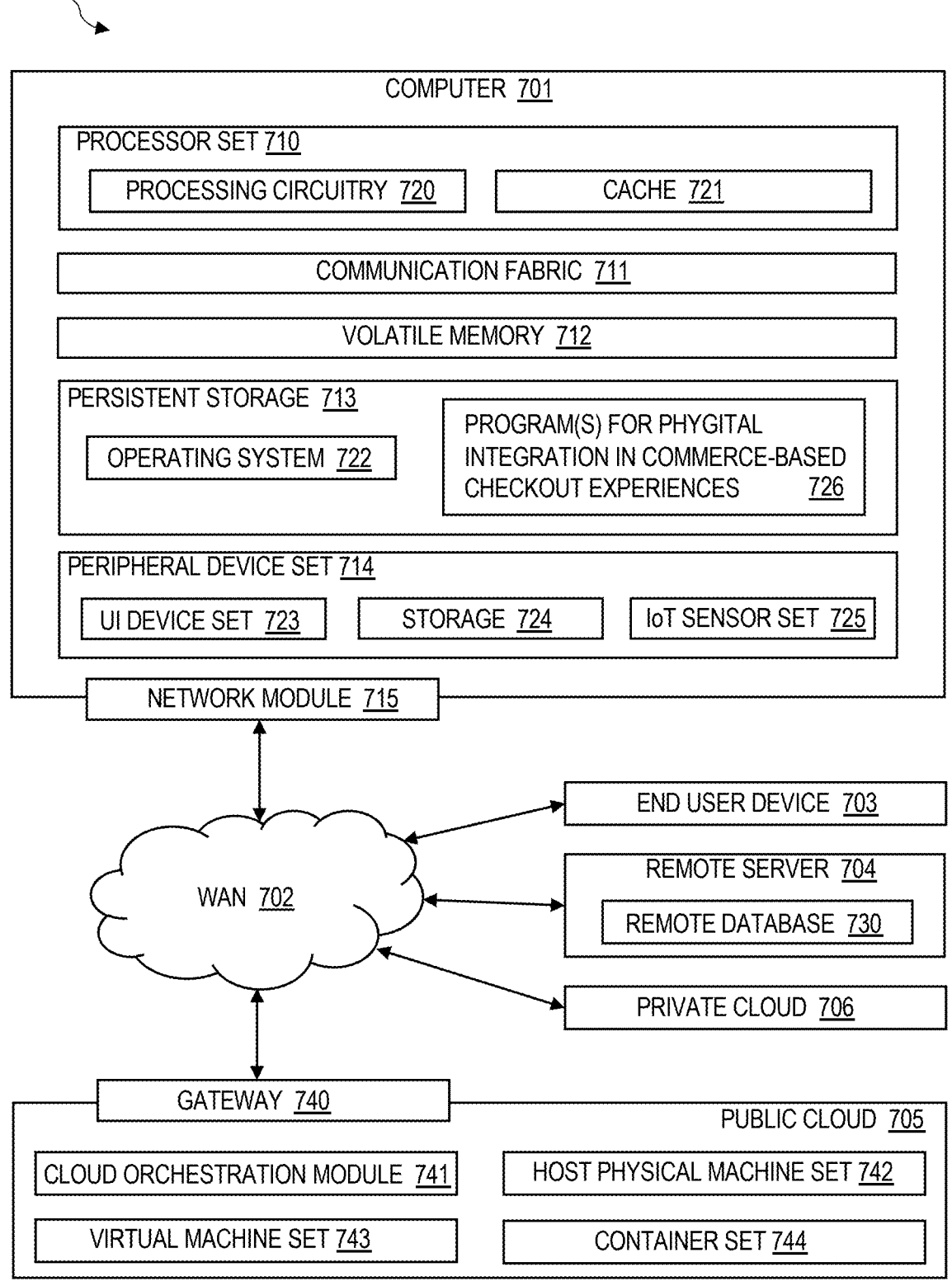

COMPUTER 701

PROCESSOR SET 710

PROCESSING CIRCUITRY 720          CACHE 721

COMMUNICATION FABRIC 711

VOLATILE MEMORY 712

PERSISTENT STORAGE 713

OPERATING SYSTEM 722

PROGRAM(S) FOR PHYGITAL INTEGRATION IN COMMERCE-BASED CHECKOUT EXPERIENCES          726

PERIPHERAL DEVICE SET 714

UI DEVICE SET 723          STORAGE 724          IoT SENSOR SET 725

NETWORK MODULE 715

WAN 702

END USER DEVICE 703

REMOTE SERVER 704

REMOTE DATABASE 730

PRIVATE CLOUD 706

GATEWAY 740

PUBLIC CLOUD 705

CLOUD ORCHESTRATION MODULE 741          HOST PHYSICAL MACHINE SET 742

VIRTUAL MACHINE SET 743          CONTAINER SET 744

FIG. 7

PHYGITAL INTEGRATION IN COMMERCE-BASED CHECKOUT EXPERIENCES

BACKGROUND

The present invention relates generally to integration of physical and digital data, and more particularly to merging the physical and digital realms to create seamless commerce interactions.

In commerce landscapes today, traditional checkout experiences often fall short of meeting the evolving expectations of customers. Frustrations arise from long queues, impersonal transactions, and lack of tailored recommendations or rewards. Consequently, businesses face the challenge of providing truly engaging and frictionless commerce experiences that meet demands of modern customers. The absence of real-time feedback and insights into customer's physical and emotional states during checkouts further exacerbates the problem. Without comprehensive understanding of the customer's needs, preferences, and overall experience, businesses are limited in their ability to optimize and enhance the checkout processes. Traditional methods of collecting customer feedback, such as surveys and post-purchase reviews, often fall short as they rely on retrospective and subjective data.

SUMMARY

In one aspect, a computer-implemented method for phygital integration in commerce-based checkout experiences is provided. The computer-implemented method includes aggregating data from one or more personal devices of a user and data from one or more biosensors of the user. The computer-implemented method further includes training a machine learning model on features extracted from aggregated data. The computer-implemented method further includes using the machine learning model to predict purchase preferences of the user. The computer-implemented method further includes using the machine learning model to generate for the user personalized recommendations, promotions, and loyalty rewards, based on the purchase preferences of the user. The computer-implemented method further includes generating notifications about the personalized recommendations, promotions, and loyalty rewards. The computer-implemented method further includes transmitting the notifications to the one or more personal devices. The computer-implemented method further includes monitoring interactions of the user with the personalized recommendations, promotions, and loyalty rewards. The computer-implemented method further includes using information of the interactions to train the machine learning model for future prediction of the purchase preferences and future generation of the personalized recommendations, promotions, and loyalty rewards.

In another aspect, a computer program product for phygital integration in commerce-based checkout experiences is provided. The computer program product comprises a computer readable storage medium having program instructions embodied therewith, and the program instructions are executable by one or more processors. The program instructions are executable to aggregate data from one or more personal devices of a user and data from one or more biosensors of the user. The program instructions are further executable to train a machine learning model on features extracted from aggregated data. The program instructions are further executable to use the machine learning model to predict purchase preferences of the user. The program instructions are further executable to use the machine learning model to generate for the user personalized recommendations, promotions, and loyalty rewards, based on the purchase preferences of the user. The program instructions are further executable to generate notifications about the personalized recommendations, promotions, and loyalty rewards. The program instructions are further executable to transmit the notifications to the one or more personal devices. The program instructions are further executable to monitor interactions of the user with the personalized recommendations, promotions, and loyalty rewards. The program instructions are further executable to use information of the interactions to train the machine learning model for future prediction of the purchase preferences and future generation of the personalized recommendations, promotions, and loyalty rewards.

In yet another aspect, a computer system for phygital integration in commerce-based checkout experiences is provided. The computer system comprises one or more processors, one or more computer readable tangible storage devices, and program instructions stored on at least one of the one or more computer readable tangible storage devices for execution by at least one of the one or more processors. The program instructions are executable to: aggregate data from one or more personal devices of a user and data from one or more biosensors of the user; train a machine learning model on features extracted from aggregated data; use the machine learning model to predict purchase preferences of the user; use the machine learning model to generate for the user personalized recommendations, promotions, and loyalty rewards, based on the purchase preferences of the user; generate notifications about the personalized recommendations, promotions, and loyalty rewards; transmit the notifications to the one or more personal devices; monitor interactions of the user with the personalized recommendations, promotions, and loyalty rewards; and use information of the interactions to train the machine learning model for future prediction of the purchase preferences and future generation of the personalized recommendations, promotions, and loyalty rewards.

BRIEF DESCRIPTION OF THE SEVERAL VIEWS OF THE DRAWINGS

FIG. 6 is a flowchart showing operational steps of phygital integration in commerce-based checkout experiences, in accordance with one embodiment of the present invention.

FIG. 7 is a systematic diagram illustrating an example of an environment for the execution of at least some of the computer code involved in phygital integration in commerce-based checkout experiences, in accordance with one embodiment of the present invention.

DETAILED DESCRIPTION

Figure 1:
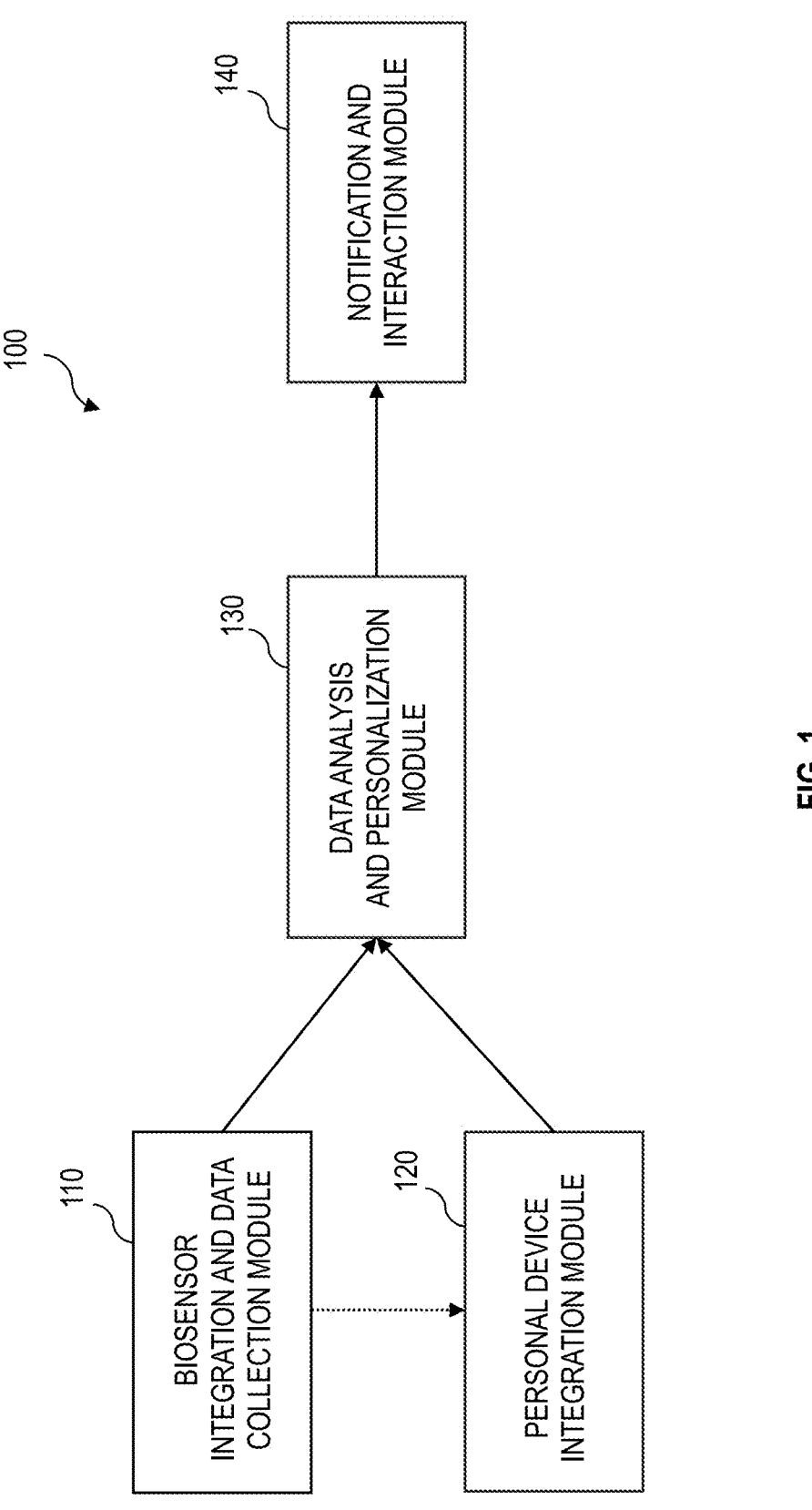
FIG. 1 illustrates a system for phygital integration in commerce-based checkout experiences, in accordance with one embodiment of the present invention.

In commerce landscapes today, the lack of integration between biosensors and personal devices such as smartphones and wearables presents a significant hurdle in achieving a cohesive phygital commerce experience. With customers increasingly relying on these personal devices, businesses are missing out on valuable opportunities to interact and engage with customers on a more personalized and convenient level. The absence of phygital integration hampers seamless communication, personalized recommendations, and real-time updates, leaving businesses struggling to deliver a truly immersive and transformative checkout experience.

In light of these challenges, the present invention seeks to address these pain points by leveraging biosensors and personal devices to create a seamless and personalized commerce experience. By incorporating real-time feedback from biosensors, businesses can gain valuable insights into customers' physical and emotional states, enabling the customers to tailor interactions and optimize the checkout process based on individual needs. Integration with personal devices empowers businesses to deliver timely notifications, personalized recommendations, and loyalty rewards, enhancing overall commerce experiences.

Embodiments of the present invention disclose a system for phygital integration in commerce-based checkout experiences. The phygital (physical+digital) integration will revolutionize the way that customers experience commerce-based transactions. The phygital integration merges the physical and digital realms to create seamless and immersive commerce interactions. This transformative approach combines the utilization of biosensors for real-time data collection with the integration of personal devices such as smartphones and wearables.

In embodiments of the present invention, by leveraging biosensors, customers can receive live, dynamic feedback about their physical and emotional states during commerce-based checkout experiences, enabling personalized and tailored interactions. These biosensors capture vital information (such as heart rate, body temperature, and other relevant metrics) and provide valuable insights that enhance the overall customer experience.

In embodiments of the present invention, through integration with personal devices such as smartphones and wearables, a checkout process is further transformed. Customers can engage with the disclosed system of the present invention that leverages the data collected by biosensors and personalizes their experience accordingly. The phygital integration allows for the delivery of personalized recommendations, promotions, and loyalty rewards based on the individual's preferences, purchase history, and location. By seamlessly merging the physical and digital spaces, customers can access relevant information, receive timely notifications, and engage in more enriched and convenient checkout experiences.

In embodiments of the present invention, the utilization of biosensors and integration with personal devices empower customers to enjoy seamless and personalized checkout experiences. By combining real-time data collection with the convenience of smartphones and wearables, traditional checkout processes are transformed into dynamic, interactive, and tailored interactions. This innovative approach allows for deeper understanding of individual preferences and emotions and enables businesses to provide a heightened level of customer service and satisfaction. By bridging the gap between the physical and digital worlds, businesses can create more engaging and immersive commerce experiences that cater to the unique needs and preferences of each customer.

The system disclosed in the present invention aims to integrate biosensors and personal devices to create a hybrid phygital scope coverage for customers during physical human commerce exchanges. By collecting real-time data from biosensors and personal devices, the system disclosed in the present invention provides dynamic feedback and insights into customers' physical and emotional states, enabling personalized and tailored experiences. The system disclosed in the present invention leverages machine learning algorithms to analyze the collected data and deliver personalized recommendations, promotions, and loyalty rewards. Through seamless integration with existing systems and loyalty programs, the system disclosed in the present invention transforms traditional checkout experiences, enhancing customer satisfaction and loyalty while driving revenue growth.

The input of the disclosed system includes real-time data from biosensors on the human; for example, the real-time data from biosensors includes heart rate, body temperature, and stress levels. The input of the disclosed system further includes data from personal devices such as smartphones and wearables; for example, the data from personal devices includes location and personal past purchasing preferences. The input of the disclosed system further includes customer information from loyalty programs. The input of the disclosed system further includes interaction data from physical commerce systems, for example, grocery checkout systems and airport kiosks.

The output of the disclosed system includes personalized recommendations for products or services based on customer preferences and real-time data. The output of the disclosed system further includes offers, promotions, and loyalty rewards tailored to individual customers. The output of the disclosed system further includes real-time notifications and alerts for important updates during the commerce-based interaction; for example, real-time notifications and alerts include turn at a grocery checkout line and flight check-in readiness. The disclosed system provides enhanced customer experiences through improved efficiency, personalized interactions, and seamless integration with the physical commerce environment.

FIG. 1 illustrates system 100 for phygital integration in commerce-based checkout experiences, in accordance with one embodiment of the present invention. System 100 includes four modules: biosensor integration and data collection module 110, personal device integration module 120, data analysis and personalization module 130, and notification and interaction module 140. System 100 for phygital integration in commerce-based checkout experiences is hosted by a computer system or server. The computer system or server may be any electronic device capable of receiving input from a user, executing computer program instructions, and communicating with another computing system or another server. Computer 701 shown in FIG. 7 is an example of the computer system or server.

Biosensor integration and data collection module 110 is responsible for the integration and interaction with the biosensors that capture real-time data about the customer's physical and emotional states. The real-time data includes data such as heart rate, body temperature, and stress levels.

Personal device integration module 120 works in tandem with biosensor integration and data collection module 110. Personal device integration module 120 is responsible for integrating and interacting with the customer's personal devices, such as smartphones and wearable devices. Personal device integration module 120 is used to leverage data such as location, past purchasing preferences, and customer information from loyalty programs.

Data analysis and personalization module 130 uses machine learning algorithms to analyze the data collected by both biosensor integration and data collection module 110 and personal device integration module 120. Data analysis and personalization module 130 generates personalized recommendations, promotions, and loyalty rewards, based on the data collected by both biosensor integration and data collection module 110 and personal device integration module 120. The data collected by the both modules, for example, may include customer's current state, location, and past purchasing preferences. Data analysis and personalization module 130 dynamically updates the recommendations in real-time.

Notification and interaction module 140 is responsible for delivering personalized notifications and interactions to the customer. Notification and interaction module 140 uses the information generated by data analysis and personalization module 130 to enhance the customer's checkout experience. Notification and interaction module 140 sends the customer alerts for updates during the commerce-based interaction, such as a turn at the grocery checkout line or flight check-in readiness.

In FIG. 1, the solid arrow lines represent that data is sent from biosensor integration and data collection module 110 to data analysis and personalization module 130, sent from personal device integration module 120 to data analysis and personalization module 130, sent from data analysis and personalization module 130 to notification and interaction module 140. The dotted arrow line between biosensor integration and data collection module 110 and personal device integration module 120 represents a association relationship where biosensor integration and data collection module 110 contains or makes use of personal device integration module 120. Biosensor integration and data collection module 110 has a dependency on personal device integration module 120 as part of its functionality.

APIs (Application Programming Interfaces) such as REST (Representational State Transfer) or GraphQL (an open-source data query and manipulation language for APIs and a query runtime engine) facilitate the transfer of data between the above mentioned modules and the server.

Figure 2:
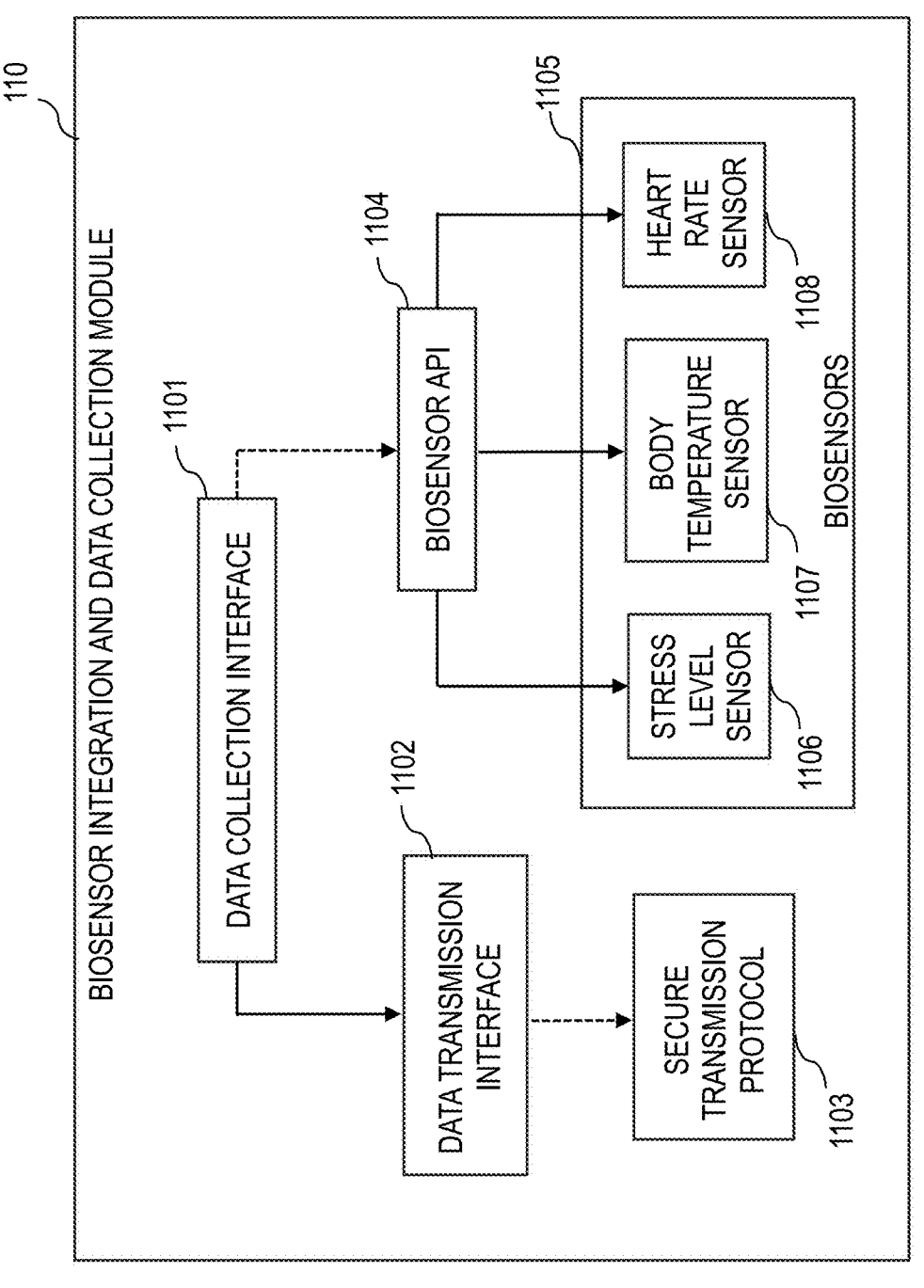
FIG. 2 illustrates a biosensor integration and data collection module in a system for phygital integration in commerce-based checkout experiences, in accordance with one embodiment of the present invention.

FIG. 2 illustrates biosensor integration and data collection module 110 in system 100 for phygital integration in commerce-based checkout experiences, in accordance with one embodiment of the present invention. Biosensor integration and data collection module 110 includes data collection interface 1101, data transmission interface 1102, secure transmission protocol 1103, biosensor API 1104 which includes application programming interfaces (APIs) of biosensors 1105. For example, biosensors 1105 may be at least one of stress level sensor 1106, body temperature sensor 1107, and heart rate sensor 1108. In FIG. 2, the solid arrow lines represent required or mandatory paths while the dashed arrow lines represent optional paths.

Biosensor integration and data collection module 110 defines types of data to be collected from biosensors 1105 (e.g., stress level sensor 1106, body temperature sensor 1107, and/or heart rate sensor 1108). Biosensor integration and data collection module 110 determines suitable types of biosensors to use for data collection, considering factors such as accuracy, reliability, and ease of use for the customer. Data collection interface 1101 develops a process for capturing data from the biosensors. The collected biosensor data is processed using machine learning algorithms such as time-series analysis or clustering algorithms to detect patterns, anomalies, or specific states.

Data transmission interface 1102 develops a process for transmitting data from the biosensors to the disclosed system of the present invention. Secure transmission protocol 1103 implements secure protocols for data transmission to ensure privacy and data security. Secure data transmission protocols include, for example, HTTPS or SSL for transferring data from the biosensors to the disclosed system. The disclosed system adheres to health data privacy standards such as HIPAA (Health Insurance Portability and Accountability Act) or GDPR (General Data Protection Regulation).

Biosensor API 1104 includes APIs of different biosensor manufacturers. The APIs are used to integrate the biosensors with the disclosed system of the present invention. Standard health data APIs such as Google Fit or Apple Health may be leveraged for collecting health-related data from existing user devices.

Figure 3:
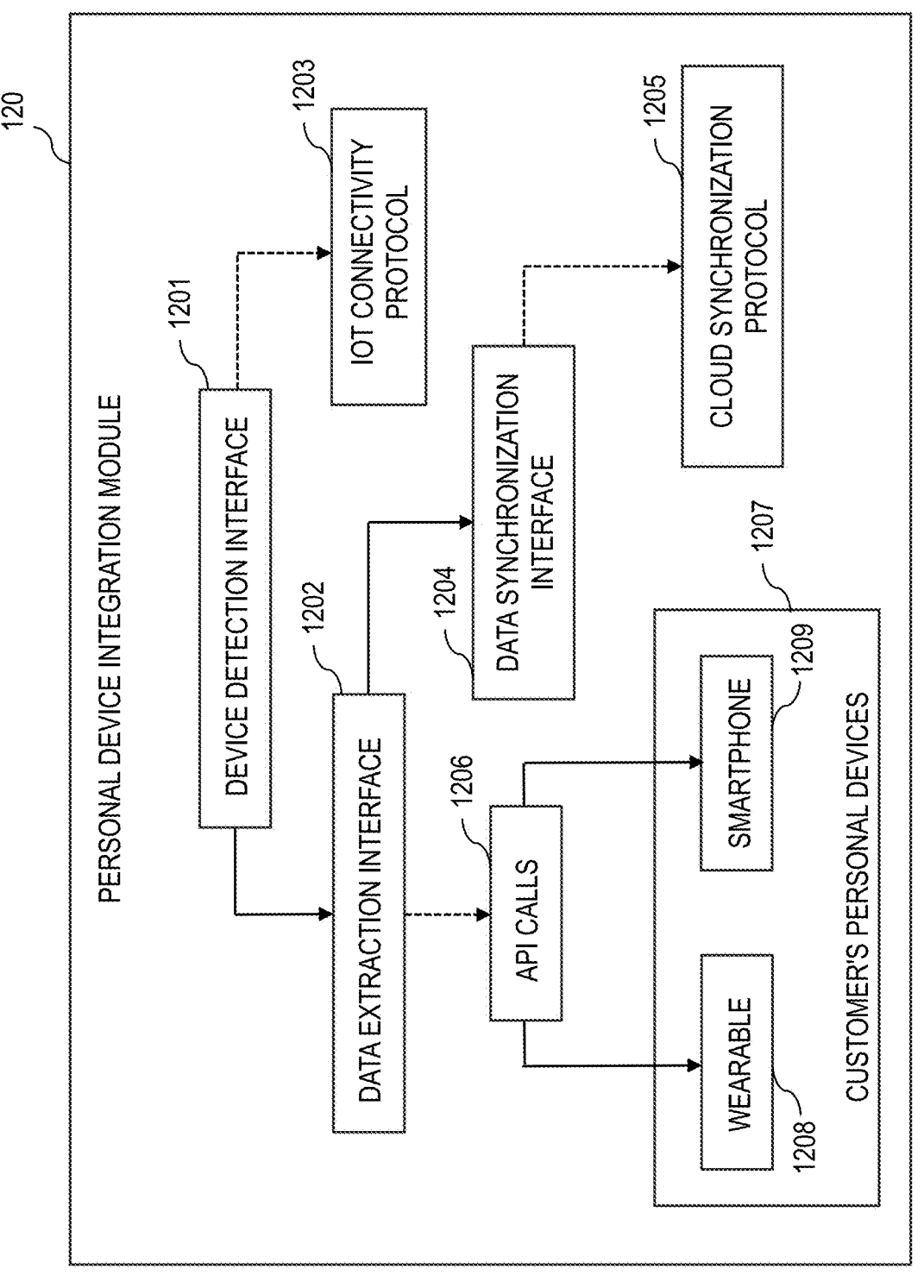
FIG. 3 illustrates a personal device integration module in a system for phygital integration in commerce-based checkout experiences, in accordance with one embodiment of the present invention.

FIG. 3 illustrates personal device integration module 120 in system 100 for phygital integration in commerce-based checkout experiences, in accordance with one embodiment of the present invention. Personal device integration module 120 includes device detection interface 1201, data extraction interface 1202, IoT connectivity protocol 1203, data synchronization interface 1204, cloud synchronization protocol 1205, API calls 1206 for customer's personal devices 1207 (e.g., wearable 1208 and/or smartphone 1209). In FIG. 3, the solid arrow lines represent required or mandatory paths while the dashed arrow lines represent optional paths.

Device detection interface 1201 detects customer's personal devices 1207 (e.g., wearable 1208 and/or smartphone 1209) and pairs with the personal devices using IoT connectivity protocol 1203 such as Bluetooth or Wi-Fi. Device detection interface 1201 establishes a secure connection with the customer's personal devices and initiates data exchange.

Data extraction interface 1202 retrieves relevant data from the customer's personal devices, using pre-defined API calls 1206. The relevant data include, for example, location, preferences, and customer information from loyalty programs. Personal device integration module 120 further normalizes the retrieved data and pre-processes for further analysis and utilization in data analysis and personalization module 130.

Data synchronization interface 1204 synchronizes the received data with a cloud server to ensure that the received data is updated in real-time and accessible to other components, using cloud synchronization protocol 1205. Data synchronization interface 1204 continually monitors changes in the data retrieved from the customer's personal devices and updates the centralized server.

In the implementation of personal device integration module 120, REST APIs facilitate the interaction between the customer's personal devices and personal device integration module 120. These APIs are responsible for extracting and sending data from personal devices to the server. In the implementation of personal device integration module 120, secure data transmission standards such as SSL/TLS ensure that the exchanged data remains confidential and integral. In the implementation of personal device integration module 120, OAuth 2.0 is used to authorize access to the data on the customer's personal devices, ensuring privacy and consent are maintained.

Figure 4:
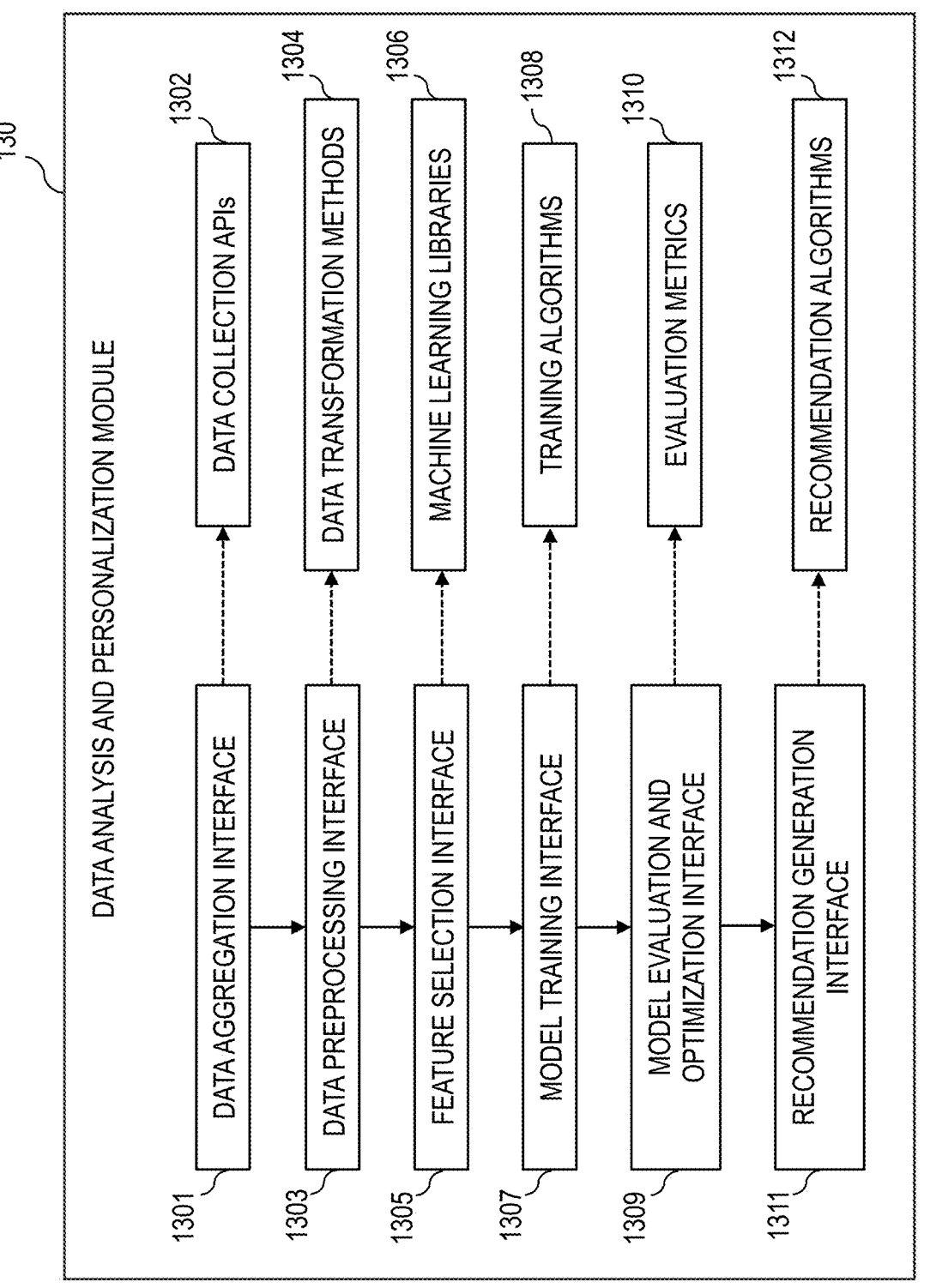
FIG. 4 illustrates a data analysis and personalization module in a system for phygital integration in commerce-based checkout experiences, in accordance with one embodiment of the present invention.

FIG. 4 illustrates data analysis and personalization module 130 in system 100 for phygital integration in commerce-based checkout experiences, in accordance with one embodiment of the present invention. Data analysis and personalization module 130 includes data aggregation interface 1301, data collection APIs 1302, data preprocessing interface 1303, data transformation methods 1304, feature selection interface 1305, machine learning libraries 1306, model training interface 1307, training algorithms 1308, model evaluation and optimization interface 1309, evaluation metrics 1310, recommendation generation interface 1311, and recommendation algorithms 1312.

Data aggregation interface 1301 aggregates the data from biosensor integration and data collection module 110 and the data from personal device integration module 120. The data is collected from the two modules, using data collection APIs 1302. The collected data includes physical and emotional metrics, location, and purchase history.

Data preprocessing interface 1303 cleans, normalizes, and transforms the aggregated data into a suitable format for further analysis. Data preprocessing interface 1303 appropriately handles any missing values or outliers to ensure the integrity of the subsequent analysis. Data preprocessing interface 1303 uses data transformation methods 1304 to remove or impute missing values, handle outliers, and normalize or scale numerical data to ensure uniformity. For example, heart rate data may be scaled to a standard range for all users.

Feature selection interface 1305 selects relevant features from the preprocessed data. The relevant features may include specific biometrics, purchase history, time of day, and etc. Machine learning algorithms in machine learning libraries 1306 are used to select the relevant features.

Using training algorithms 1308, model training interface 1307 trains machine learning models on the selected features which are determined by feature selection interface 1305. The machine learning models are designed to predict customer preferences and to generate personalized recommendations. For example, Python libraries such as TensorFlow (open-source software library for machine learning and artificial intelligence) or PyTorch (a machine learning framework) can be used to predict user preferences and to analyze usage patterns.

Model evaluation and optimization interface 1309 evaluates how well the machine learning models perform, specifically in terms of predicting customer preferences and generating accurate personalized recommendations. Model evaluation and optimization interface 1309 allows data scientists to test different hyperparameters and model architectures to optimize performance of the machine learning models. Model evaluation and optimization interface 1309 uses evaluation metrics 1310 to evaluate the machine learning models. The metrics may include precision (e.g., how many of the recommended items are relevant), recall (e.g., how many of the relevant items are recommended), and mean absolute error for continuous predictions (e.g., the likelihood of purchase).

Recommendation generation interface 1311 generates personalized recommendations, promotions, and loyalty rewards, based on the predictions of the optimized machine learning models. Recommendation generation interface 1311 passes these recommendations to notification and interaction module 140. Recommendation generation interface 1311 uses recommendation algorithms 1312 to make predictions, based on the behavior of similar users and content-based filtering to suggest items similar to what the user has liked before. Recommendation generation interface 1311 uses recommendation algorithms 1312 to analyze the features selected from the user's biometric data, purchase history, and other contextual information. Recommendation generation interface 1311 uses collaborative filtering and content-based filtering models to generate personalized recommendations based on the user's preferences and behavior.

For the data preprocessing and the machine learning model training, data analysis and personalization module 130 utilizes libraries such as Scikit-learn (a free software machine learning library) or TensorFlow (open-source software library for machine learning and artificial intelligence). The libraries provide a wide range of tools for the data manipulation and the machine learning model training. Furthermore, Keras (an open-source library for artificial neural networks) is used for constructing and training deep learning models, especially when working with complex data such as user's emotional states derived from biometrics.

Figure 5:
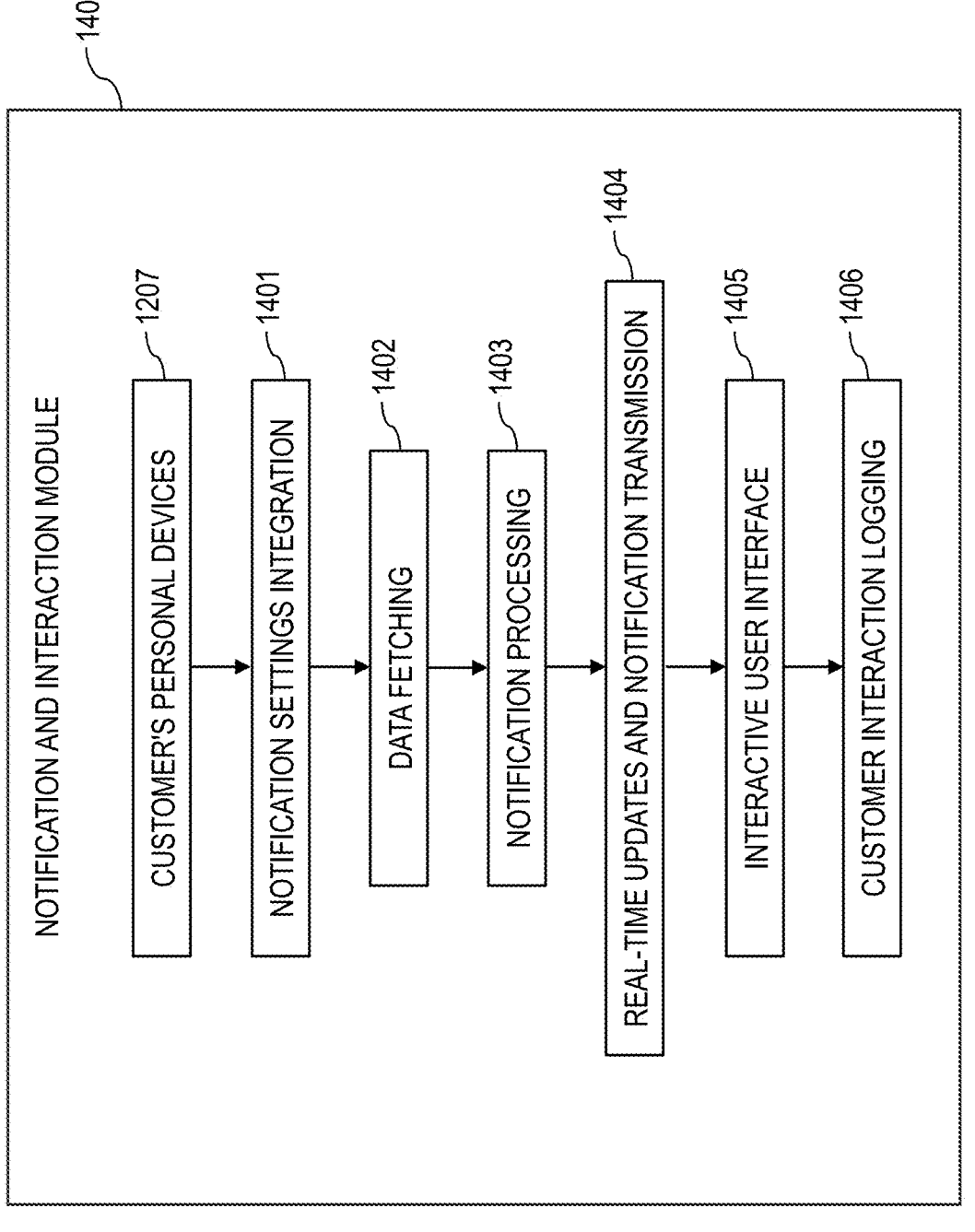
FIG. 5 illustrates a notification and interaction module in a system for phygital integration in commerce-based checkout experiences, in accordance with one embodiment of the present invention.

FIG. 5 illustrates notification and interaction module 140 in system 100 for phygital integration in commerce-based checkout experiences, in accordance with one embodiment of the present invention. Notification and interaction module 140 includes notification settings integration 1401, data fetching 1402, notification processing 1403, real-time updates and notification transmission 1404, interactive user interface 1405, and customer interaction logging 1406.

Notification settings integration 1401 integrates with settings of customer's personal devices 1207 to gain permission for sending the notifications and the alerts to customer's personal devices 1207. Data fetching 1402 fetches data processed by data analysis and personalization module 130. The fetched data includes the personalized recommendations, promotions, and loyalty rewards. Notification processing 1403 processes the fetched data to generate the notifications. Further, notification processing 1403 customizes the notifications to the customer's personal devices.

Real-time updates and notification transmission 1404 transmits the notifications to the customer's personal devices. Notification and interaction module 140 provides interactive user interface 1405. Through interactive user interface 1405, customers can view the recommendations, accept the promotions, and review the loyalty rewards. Interactive user interface 1405 is customized based on the customer's preferences and past interactions. Customer interaction logging 1406 logs customer reactions and interactions with the personalized recommendations, promotions, and loyalty rewards. The logged customer reactions and interactions are used for future analysis and personalization.

Notification and interaction module 140 utilizes secure data communication protocols. The secure data communication protocols include HTTPS (Hypertext Transfer Protocol Secure) and WebSocket (a protocol providing simultaneous two-way communication channels over a single Transmission Control Protocol connection) to ensure safe and real-time transmission of the notifications and the alerts.

Notification and interaction module 140 uses clustering unsupervised learning algorithms to categorize customer reactions. Notification and interaction module 140 uses reinforcement learning methods to continually improve the relevance and timing of the notifications and the alerts based on customer feedback.

The UI/UX (User Interface/User Experience) of notification and interaction module 140 is designed using popular frameworks such as React Native (an open-source UI software framework) or Flutter (an open-source UI software development kit). The UI/UX design ensures compatibility across different types of the customer's personal devices.

FIG. 6 is a flowchart showing operational steps of phygital integration in commerce-based checkout experiences, in accordance with one embodiment of the present invention. The operational steps are executed by a computer system or a server. The computer system or server may be any electronic device capable of receiving input from a user, executing computer program instructions, and communicating with another computing system or another server. Computer 701 shown in FIG. 7 is an example of the computer system or server.

In step 601, the computer system or server collects data from one or more biosensors of a customer. For example, the one or more biosensors of a customer may be a stress level sensor, a body temperature sensor, and/or a heart rate sensor. The computer system or server defines what types of the data from the one or more biosensors are collected and determines suitable types of the data from the one or more biosensors to be collected. The computer system or server develops a process for capturing data from the one or more biosensors. In collecting the data from the one or more biosensors, the computer system or server uses machine learning algorithms such as time-series analysis or clustering algorithms to detect patterns, anomalies, or specific states. In the embodiment shown in FIG. 1 and FIG. 2, biosensor integration and data collection module 110 collects data from biosensors 1105 such as stress level sensor 1106, body temperature sensor 1107, and heart rate sensor 1108.

In step 602, the computer system or server retrieves data from one or more personal devices of the customer. For example, the one or more personal devices of the customer may be a wearable and/or a smartphone. The computer system or server pre-processes the retrieved data for further analysis and utilization in next steps. The computer system or server synchronizes the received data with the server to ensure that the retrieved data is updated in real-time. The computer system or server continually monitors changes in the data retrieved from the customer's personal devices. In the embodiment shown in FIG. 1 and FIG. 3, personal device integration module 120 retrieves data from customer's personal devices 1207 such as wearable 1208 and smartphone 1209.

In step 603, the computer system or server aggregates the data from the one or more personal devices and the data from the one or more biosensors. Further, the computer system or server cleans, normalizes, and transforms the aggregated data into a suitable format for further analysis. The computer system or server removes or imputes missing values, handles outliers, and normalizes or scales numerical data to ensure uniformity. In the embodiment shown in FIG. 1 and FIG. 4, data analysis and personalization module 130 aggregates the data from the one or more personal devices and the data from the one or more biosensors.

In step 604, the computer system or server extracts features from the aggregated data. For example, the features may include specific biometrics, purchase history, time of day, and etc. The computer system or server uses machine learning algorithms to select the relevant features. In the embodiment shown in FIG. 1 and FIG. 4, data analysis and personalization module 130 extracts the features from the aggregated data.

In step 605, the computer system or server trains a machine learning model on the features. The machine learning model is trained to predict customer preferences and to generate personalized recommendations, promotions, and loyalty rewards. In the embodiment shown in FIG. 1 and FIG. 4, data analysis and personalization module 130 trains the machine learning model.

In step 606, the computer system or server uses the machine learning model trained in step 605 to predict customer preferences. The customer preferences, for example, may include customer's past purchasing preferences. In the embodiment shown in FIG. 1 and FIG. 4, data analysis and personalization module 130 predicts customer preferences using the machine learning model.

The computer system or server evaluates how well the machine learning model performs in terms of predicting the customer preferences. Through the evaluation of the machine learning model, different hyperparameters and model architectures are tested to optimize performance of the machine learning model.

In step 607, the computer system or server generates for the customer personalized recommendations, promotions, and loyalty rewards, based on prediction of the customer preferences. In the embodiment shown in FIG. 1, FIG. 4, and FIG. 5, data analysis and personalization module 130 generates the personalized recommendations, promotions, and loyalty rewards, and then data analysis and personalization module 130 passes data about these personalized recommendations promotions, and loyalty rewards to notification and interaction module 140.

In step 608, the computer system or server generates notifications about the personalized recommendations, promotions, and loyalty rewards. The computer system or server fetches the data about the personalized recommendations, promotions, and loyalty rewards. After processing the fetched data, the computer or server generates notifications. In the embodiment shown in FIG. 1, FIG. 4, and FIG. 5, notification and interaction module 140 fetches the data from data analysis and personalization module 130; based on the fetched data, notification and interaction module 140 generates the notifications.

In step 609, the computer system or server gains permission for sending the notifications to the one or more personal devices. The computer system or server integrates with settings of customer's personal devices to gain the permission. In the embodiment shown in FIG. 1 and FIG. 5, notification and interaction module 140 integrates with settings of the customer's personal devices and gains the permission to the customer's personal devices.

In step 610, the computer system or server transmits the notifications to the one or more personal devices. Before transmitting the notifications, the computer system or server customizes the notifications to the customer's personal devices. In the embodiment shown in FIG. 1 and FIG. 5, notification and interaction module 140 transmits the notifications to the customer's personal devices.

The computer system or server provides an interactive user interface. Through the interactive user interface, the customer views and interacts with the personalized recommendations, promotions, and loyalty rewards. In step 611, the computer system or server monitors customer interactions with the personalized recommendations, promotions, and loyalty rewards, through the interactive user interface on the one or more personal devices of the customer. In the embodiment shown in FIG. 1 and FIG. 5, notification and interaction module 140 provides the interactive user interface on the customer's personal devices and monitors the customer interactions.

In step 612, the computer system or server stores the customer interactions for future generalization of the personalized recommendations, promotions, and loyalty rewards. The computer system or server logs the customer's interactions with the notifications, updates, and recommendations. The computer system or server uses information of the customer interaction to train the machine learning model, for future prediction of the customer preferences and future determination of the personalized recommendations, promotions, and loyalty rewards.

In a first use case, a user frequently shops at a local grocery store. The user is in a rush and needs to quickly pick up groceries. The user wants a smooth and efficient checkout process that respects user's time and preferences. The disclosed system of the present invention seamlessly integrates a user's smartphone with a checkout system of the local grocery store. As the user shops, biosensors on user's body capture real-time physical and emotional states of the user. The disclosed system recommends customized products and offers based on user's preferences and current needs. At a checkout counter, the user is automatically identified, user's transaction is streamlined and completed with personalized coupons and rewards. The user leaves the store feeling satisfied with the efficient and personalized shopping experience.

In a second use case, a user needs to book a last-minute airplane ticket at an airport kiosk due to an unexpected change in a travel plan. The disclosed system of the present invention analyze user's real-time stress levels collected from user's biosensor and location data retrieved from user's personal device. The disclosed system provides insights into user's current state. As the user navigates through a booking process, the disclosed system dynamically adjusts the interface on the user's smartphone, presenting options and recommendations tailored to user's preferences and stressed emotional state. The user's interface on the smartphone also suggests amenities and services that enhance user's travel experience (destress). With a seamless integration between user's personal device and the airport kiosk, the user feels supported and empowered to make quick and informed decisions, ultimately booking a ticket with ease and confidence.

In a third use case, a retail brand manager implements the disclosed system of the present invention in stores to create a personalized and exclusive shopping experience for customers. The disclosed system integrates customers' personal devices and leverages biosensors to capture real-time data on preferences, emotions, and physical states of the customers. By analyzing the real-time data, the disclosed system offers personalized product recommendations, exclusive promotions, and tailored experiences to enhance customer satisfaction and foster brand loyalty. The seamless integration with loyalty programs ensures a curated and elevated shopping journey, resulting in increased customer engagement and revenue growth for the retail brand.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two opera-tions shown in successive flowchart blocks may be performed in reverse order, as a single integrated step, concurrently, or in a manner at least partially overlapping in time.

A computer program product embodiment (CPP embodiment or CPP) is a term used in the present disclosure to describe any set of one, or more, storage media (also called mediums) collectively included in a set of one, or more, storage devices that collectively include machine readable code corresponding to instructions and/or data for performing computer operations specified in a given CPP claim. A storage device is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

In FIG. 7, computing environment 700 contains an example of an environment for the execution of at least some of the computer code involved in performing the inventive methods, such as program(s) 726 for phygital integration in commerce-based checkout experiences. In addition to block 726, computing environment 700 includes, for example, computer 701, wide area network (WAN) 702, end user device (EUD) 703, remote server 704, public cloud 705, and private cloud 706. In this embodiment, computer 701 includes processor set 710 (including processing circuitry 720 and cache 721), communication fabric 711, volatile memory 712, persistent storage 713 (including operating system 722 and block 726, as identified above), peripheral device set 714 (including user interface (UI) device set 723, storage 724, and Internet of Things (IoT) sensor set 725), and network module 715. Remote server 704 includes remote database 730. Public cloud 705 includes gateway 740, cloud orchestration module 741, host physical machine set 742, virtual machine set 743, and container set 744.

Computer 701 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 730. As is well understood in the art of computer technology, and depending upon the technology, performance of a computer-implemented method may be distributed among multiple computers and/ or between multiple locations. On the other hand, in this presentation of computing environment 700, detailed discussion is focused on a single computer, specifically computer 701, to keep the presentation as simple as possible. Computer 701 may be located in a cloud, even though it is not shown in a cloud in FIG. 7. On the other hand, computer 701 is not required to be in a cloud except to any extent as may be affirmatively indicated.

Processor set 710 includes one, or more, computer processors of any type now known or to be developed in the future. Processing circuitry 720 may be distributed over multiple packages, for example, multiple, coordinated integrated circuit chips. Processing circuitry 720 may implement multiple processor threads and/or multiple processor cores. Cache 721 is memory that is located in the processor chip package(s) and is typically used for data or code that should be available for rapid access by the threads or cores running on processor set 710. Cache memories are typically organized into multiple levels depending upon relative proximity to the processing circuitry. Alternatively, some, or all, of the cache for the processor set may be located off chip. In some computing environments, processor set 710 may be designed for working with qubits and performing quantum computing.

Computer readable program instructions are typically loaded onto computer 701 to cause a series of operational steps to be performed by processor set 710 of computer 701 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 721 and the other storage media discussed below. The program instructions, and associated data, are accessed by processor set 710 to control and direct performance of the inventive methods. In computing environment 700, at least some of the instructions for performing the inventive methods may be stored in block 726 in persistent storage 713.

Communication fabric 711 is the signal conduction path that allows the various components of computer 701 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 712 is any type of volatile memory now known or to be developed in the future. Examples include dynamic type random access memory (RAM) or static type RAM. Typically, the volatile memory is characterized by random access, but this is not required unless affirmatively indicated. In computer 701, the volatile memory 712 is located in a single package and is internal to computer 701, but, alternatively or additionally, the volatile memory may be distributed over multiple packages and/or located externally with respect to computer 701.

Persistent storage 713 is any form of non-volatile storage for computers that is now known or to be developed in the future. The non-volatility of this storage means that the stored data is maintained regardless of whether power is being supplied to computer 701 and/or directly to persistent storage 713. Persistent storage 713 may be a read only memory (ROM), but typically at least a portion of the persistent storage allows writing of data, deletion of data and re-writing of data. Some familiar forms of persistent storage include magnetic disks and solid state storage devices. Operating system 722 may take several forms, such as various known proprietary operating systems or open source Portable Operating System Interface type operating systems that employ a kernel. The code included in block 726 typically includes at least some of the computer code involved in performing the inventive methods.

Peripheral device set 714 includes the set of peripheral devices of computer 701. Data communication connections between the peripheral devices and the other components of computer 701 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 723 may include components such as a display screen, speaker, microphone, wearable devices (such as goggles and smart watches), keyboard, mouse, printer, touchpad, game controllers, and haptic devices. Storage 724 is external storage, such as an external hard drive, or insertable storage, such as an SD card. Storage 724 may be persistent and/or volatile. In some embodiments, storage 724 may take the form of a quantum computing storage device for storing data in the form of qubits. In embodiments where computer 701 is required to have a large amount of storage (for example, where computer 701 locally stores and manages a large database) then this storage may be provided by peripheral storage devices designed for storing very large amounts of data, such as a storage area network (SAN) that is shared by multiple, geographically distributed computers. IoT sensor set 725 is made up of sensors that can be used in Internet of Things applications. For example, one sensor may be a thermometer and another sensor may be a motion detector.

Network module 715 is the collection of computer software, hardware, and firmware that allows computer 701 to communicate with other computers through WAN 702. Network module 715 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 715 are performed on the same physical hardware device. In other embodiments (for example, embodiments that utilize software-defined networking (SDN)), the control functions and the forwarding functions of network module 715 are performed on physically separate devices, such that the control functions manage several different network hardware devices. Computer readable program instructions for performing the inventive methods can typically be downloaded to computer 701 from an external computer or external storage device through a network adapter card or network interface included in network module 715.

WAN 702 is any wide area network (for example, the internet) capable of communicating computer data over non-local distances by any technology for communicating computer data, now known or to be developed in the future. In some embodiments, WAN 702 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 703 is any computer system that is used and controlled by an end user (for example, a customer of an enterprise that operates computer 701), and may take any of the forms discussed above in connection with computer 701. EUD 703 typically receives helpful and useful data from the operations of computer 701. For example, in a hypothetical case where computer 701 is designed to provide a recommendation to an end user, this recommendation would typically be communicated from network module 715 of computer 701 through WAN 702 to EUD 703. In this way, EUD 703 can display, or otherwise present, the recommendation to an end user. In some embodiments, EUD 703 may be a client device, such as thin client, heavy client, mainframe computer, desktop computer and so on.

Remote server 704 is any computer system that serves at least some data and/or functionality to computer 701. Remote server 704 may be controlled and used by the same entity that operates computer 701. Remote server 704 represents the machine(s) that collect and store helpful and useful data for use by other computers, such as computer 701. For example, in a hypothetical case where computer 701 is designed and programmed to provide a recommendation based on historical data, then this historical data may be provided to computer 701 from remote database 730 of remote server 704.

Public cloud 705 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 705 is performed by the computer hardware and/or software of cloud orchestration module 741. The computing resources provided by public cloud 705 are typically implemented by virtual computing environments that run on various computers making up the computers of host physical machine set 742, which is the universe of physical computers in and/or available to public cloud 705. The virtual computing environments (VCEs) typically take the form of virtual machines from virtual machine set 743 and/or containers from container set 744. It is understood that these VCEs may be stored as images and may be transferred among and between the various physical machine hosts, either as images or after instantiation of the VCE. Cloud orchestration module 741 manages the transfer and storage of images, deploys new instantiations of VCEs and manages active instantiations of VCE deployments. Gateway 740 is the collection of computer software, hardware, and firmware that allows public cloud 705 to communicate through WAN 702.

Some further explanation of virtualized computing environments (VCEs) will now be provided. VCEs can be stored as images. A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 706 is similar to public cloud 705, except that the computing resources are only available for use by a single enterprise. While private cloud 706 is depicted as being in communication with WAN 702, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 705 and private cloud 706 are both part of a larger hybrid cloud.

What is claimed is:

1. A computer-implemented method for phygital integration in commerce-based checkout experiences, the computer-implemented method comprising:

aggregating data from one or more personal devices of a user and data from one or more biosensors of the user, wherein the data from the one or more biosensors includes real-time data about a physical state of the user;

extracting features from the aggregated data, wherein the features include specific biometrics of the user, purchase history of the user, and contextual information;

training a machine learning model on the features extracted from aggregated data;

using the machine learning model to predict purchase preferences of the user;

using the machine learning model to generate for the user personalized recommendations, promotions, and loyalty rewards, based on the purchase preferences of the user, wherein the machine learning model utilizes collaborative filtering and content-based filtering in generating the personalized recommendations;

generating notifications about the personalized recommendations, promotions, and loyalty rewards;

transmitting the notifications to the one or more personal devices;

monitoring and logging interactions of the user with the personalized recommendations, promotions, and loyalty rewards, wherein the interactions of the user are categorized using one or more clustering unsupervised learning algorithms; and retraining, by a model evaluation and optimization interface, the machine learning model using a plurality of evaluation metrics, wherein the plurality of evaluation metrics include at least precision, recall, and mean absolute error for continuous predictions, and wherein the retraining further comprises using one or more reinforcement learning methods to tune the machine learning model based on the categorizing of the interactions for future predictions of the purchase preferences and future generation of the personalized recommendations, promotions, and loyalty rewards.

2. The computer-implemented method of claim 1, further comprising:

collecting the data from the one or more personal devices;

gaining permission for transmitting the notifications to the one or more personal devices; and providing an interaction interface on the one or more personal devices for the user to interact with the personalized recommendations, promotions, and loyalty rewards, wherein the notifications are displayed within the interaction interface.

3. The computer-implemented method of claim 1, wherein the data from the one or more personal devices includes a location, past purchasing preferences, user information from loyalty programs, and interaction data from physical commerce systems.

4. The computer-implemented method of claim 1, wherein the real-time data about the physical state of the user includes at least heart rate, temperature, and stress levels, and wherein an emotional state of the user is determined based on the physical state of the user and the specific biometrics of the user.

5. The computer-implemented method of claim 4, further comprising:

transforming the real-time data about the physical state of the user, wherein the transforming includes removing or imputing missing values, handling outliers, and scaling numerical data for uniformity, and wherein the scaling of the numerical data for uniformity includes at least scaling the heart rate data to a standard range for a plurality of users.

6. The computer-implemented method of claim 1, further comprising:

utilizing a biosensor integration and data collection module and a personal device integration module in conjunction with a data aggregation interface in the aggregating and the extracting of the features from the data.

7. The computer-implemented method of claim 6, further comprising:

determining, by the biosensor integration and data collection module, the one or more biosensors of the user to be utilized in data collection; and processing, by the biosensor integration and data collection module, the specific biometrics of the user by a time-series analysis or clustering algorithm to detect patterns, anomalies, and specific states of the user based on the specific biometrics of the user.

8. The computer-implemented method of claim 1, further comprising:

processing, by a data preprocessing interface, the aggregated data, wherein the processing includes cleaning, normalizing, and transforming the aggregated data;

removing, by the data preprocessing interface, at least a portion of the aggregated data using one or more data transformation methods; and imputing, by the data preprocessing interface, at least a portion of the aggregated data using the one or more data transformation methods.

9. The computer-implemented method of claim 1, wherein the notifications about the personalized recommendations, promotions, and loyalty rewards are displayed in an interactive user interface.

10. The computer-implemented method of claim 9, further comprising:

adjusting, in real-time, the interactive user interface based on the real-time data about the physical state of the user and an emotional state of the user; and recommending, within the interactive user interface, one or more recommendations, wherein the one or more recommendations are designed based on the physical state of the user and the emotional state of the user, wherein the emotional state of the user is determined based on the specific biometrics of the user.

11. The computer-implemented method of claim 1, wherein the one or more reinforcement learning methods further adjust timing and relevance of the future generation of the personalized recommendations.

12. The computer-implemented method of claim 1, further comprises:

evaluating the machine learning model based on the interactions of the user with the personalized recommendations; and testing different sets of hyperparameters and model architectures for the machine learning model based on the evaluating of the interactions of the user.

13. A computer program product for phygital integration in commerce-based checkout experiences, the computer program product comprising a non-transitory computer readable storage medium having program instructions stored therewith, the program instructions executable by one or more processors, the program instructions executable to:

aggregate data from one or more personal devices of a user and data from one or more biosensors of the user, wherein the data from the one or more biosensors includes real-time data about a physical state of the user;

extract features from the aggregated data, wherein the features include specific biometrics of the user, purchase history of the user, and contextual information;

train a machine learning model on the features extracted from aggregated data;

use the machine learning model to predict purchase preferences of the user;

use the machine learning model to generate for the user personalized recommendations, promotions, and loyalty rewards, based on the purchase preferences of the user, wherein the machine learning model utilizes collaborative filtering and content-based filtering in generating the personalized recommendations;

generate notifications about the personalized recommendations, promotions, and loyalty rewards;

transmit the notifications to the one or more personal devices;

monitor and log interactions of the user with the personalized recommendations, promotions, and loyalty rewards, wherein the interactions of the user are categorized using one or more clustering unsupervised learning algorithms; and retrain, by a model evaluation and optimization interface, the machine learning model using a plurality of evaluation metrics, wherein the plurality of evaluation metrics include at least precision, recall, and mean absolute error for continuous predictions, and wherein the retraining further comprises using one or more reinforcement learning methods to tune the machine learning model based on the categorizing of the interactions for future predictions of the purchase preferences and future generation of the personalized recommendations, promotions, and loyalty rewards.

14. The computer program product of claim 13, further comprising the program instructions executable to:

collect the data from the one or more personal devices;

gain permission for transmitting the notifications to the one or more personal devices; and provide an interaction interface on the one or more personal devices for the user to interact with the personalized recommendations, promotions, and loyalty rewards, wherein the notifications are displayed within the interaction interface.

15. The computer program product of claim 13, wherein the data from the one or more personal devices includes a location, past purchasing preferences, user information from loyalty programs, and interaction data from physical commerce systems.

16. A computer system for phygital integration in commerce-based checkout experiences, the computer system comprising one or more processors, one or more computer readable tangible storage devices, and program instructions stored on at least one of the one or more computer readable tangible storage devices for execution by at least one of the one or more processors, the program instructions executable to:

aggregate data from one or more personal devices of a user and data from one or more biosensors of the user, wherein the data from the one or more biosensors includes real-time data about a physical state of the user;

extract features from the aggregated data, wherein the features include specific biometrics of the user, purchase history of the user, and contextual information;

train a machine learning model on the features extracted from aggregated data;

use the machine learning model to predict purchase preferences of the user;

use the machine learning model to generate for the user personalized recommendations, promotions, and loyalty rewards, based on the purchase preferences of the user, wherein the machine learning model utilizes collaborative filtering and content-based filtering in generating the personalized recommendations;

generate notifications about the personalized recommendations, promotions, and loyalty rewards;

transmit the notifications to the one or more personal devices;

monitor and log interactions of the user with the personalized recommendations, promotions, and loyalty rewards, wherein the interactions of the user are categorized using one or more clustering unsupervised learning algorithms; and retrain, by a model evaluation and optimization interface, the machine learning model using a plurality of evaluation metrics, wherein the plurality of evaluation metrics include at least precision, recall, and mean absolute error for continuous predictions, and wherein the retraining further comprises using one or more reinforcement learning methods to tune the machine learning model based on the categorizing of the interactions for future predictions of the purchase preferences and future generation of the personalized recommendations, promotions, and loyalty rewards.

17. The computer system of claim 16, further comprising the program instruction executable to:

collect the data from the one or more personal devices;

gain permission for transmitting the notifications to the one or more personal devices; and provide an interaction interface on the one or more personal devices for the user to interact with the personalized recommendations, promotions, and loyalty rewards, wherein the notifications are displayed within the interaction interface.

* * * * *